3,101,996
PROCESS FOR REMOVAL OF ACID GAS FROM GAS STREAMS
Sidney A. Bresler, New York, and Arthur W. Francis, Yonkers, N.Y., assignors to Chemical Construction Corporation, New York, N.Y., a corporation of Delaware
Filed Mar. 29, 1961, Ser. No. 99,293
6 Claims. (Cl. 23—2)

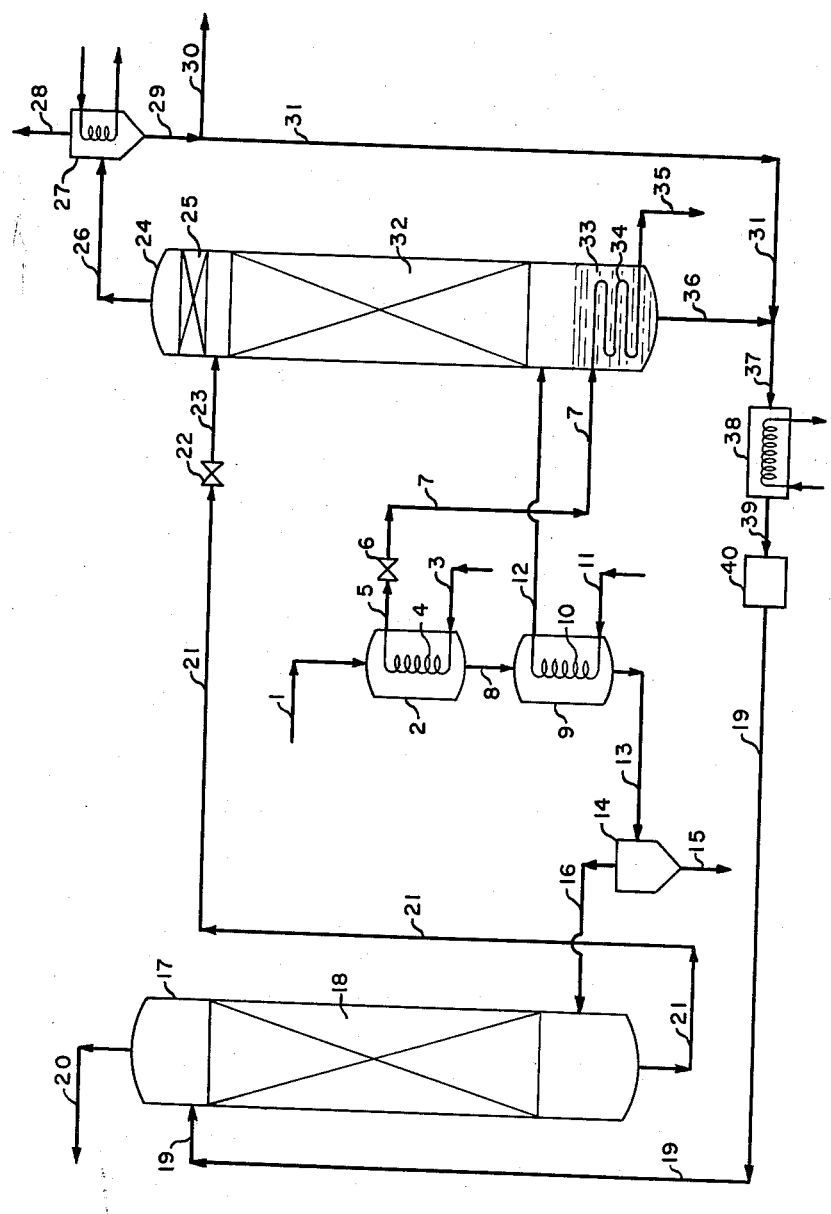

This invention relates to the removal of weakly acidic gases from gas streams. Such weakly acidic gases include carbon dioxide, hydrogen sulfide, carbonyl sulfide and hydrogen cyanide. These acidic gases are generally removed by scrubbing the gas stream with aqueous alkaline solution, principally solutions of monoethanolamine or other alkanol amine or solutions of alkali carbonates such as potassium carbonate. The resulting scrub solution, laden with absorbed acidic gas, is generally regenerated by heating, which vaporizes the acidic component. In the case of potassium carbonate solution, the gas stream is generally scrubbed at elevated pressure, and regeneration is accomplished by heating at reduced pressure. The regenerated solution is then recycled for further scrubbing, with repressurizing if necessary.

Numerous industrial processes require the removal from gas streams of large amounts of weakly acidic gases such as carbon dioxide and hydrogen sulfide. Among these may be mentioned the purification of coke oven gas or other manufactured gas such as synthesis gas or hydrogen produced by the reforming or partial oxidation of hydrocarbons, followed by the carbon monoxide oxidation procedure known as the water gas shift reaction. These processes form the basis of important industrial technology such as ammonia or methanol synthesis, synthetic organics production by Fischer-Tropsch and "Oxo" processes, and other well-known processes. Thus, the technology of carbon dioxide and hydrogen sulfide removal from gas streams is a well-developed phase of the gas scrubbing art. One of the most important processes utilized in this field involves scrubbing the gas stream at elevated pressure with a concentrated aqueous solution of potassium carbonate or potassium carbonate-bicarbonate. The solution, laden with absorbed acidic gas, is then regenerated by pressure reduction and heating, which serves to drive off the acidic gas as an off-gas mixed with steam. The regenerated solution is then re-pressurized and recycled.

The present invention is concerned with improvement in the heating procedure which is employed to regenerate such solutions. The use of hot input process gas itself as a heat source to regenerate the solution, prior to further scrubbing of the process gas for acidic gas removal, has been widely practiced in the prior art. Thus, in numerous cases the scrub solution containing absorbed acidic gas is passed into a stripper or other such apparatus for removal of contained gas from liquids. The solution is heated by indirect heat exchange with an available hot process gas which is passed through a reboiler coil disposed in or adjacent to the bottom of the stripper. Heat exchange takes place between the hot process gas and the scrub solution, and the solution is thereby heated and regenerated.

This process sequence has numerous advantages, principally in that thermal efficiency is high due to heat utilization at maximum temperature levels. However, this arrangement does possess certain disadvantages. A major problem in such installations is corrosion of the reboiler coil, due to the combined action of hot process gas within the coil and the boiling scrub solution in which the coil is submerged. The corrosive effect of the schrub solution is a combined action, due not only to the alkalinity of the solution, but also to the acidic gas component being liberated on the outer surface of the coil due to the boiling action. A most significant factor in this corrosive effect is also that the film or layer of scrub solution on the outer surface of the coil is heated to a high temperature level.

In the present invention, the corrosive action which takes place in the prior art has been eliminated, while still achieving regeneration of the scrub solution by maximum utilization of the heat content of the hot process gas. The hot process gas is passed through two stages of relatively low-pressure steam generation, prior to the scrubbing step. These two stages are at different temperature levels, but both stages usually derive heat from the process gas through condensation of moisture in the process gas stream as well as through removal of sensible heat. The steam from the first stage is passed through a small reboiler coil in the stripper, while the steam from the second stage is directly sparged or injected into the stripper. The resulting excess of steam is removed from the stripper in the overhead stream of acid gas and may be readily recovered therefrom by condensation and recycled for further steam generation or discarded.

This process arrangement has several important advantages. Direct combined action of the hot process gas and the alkaline scrub solution on the same reboiler coil is avoided. Thus, corrosion is substantially reduced and the possibility of premature or rapid failure of the reboiler is eliminated. Since relatively low pressure steam is employed, the highly corrosive alkaline scrub solution is not heated to the high temperature levels previously produced. The scrub solution is not heated to these high temperature levels, but is still completely regenerated due to the fact that a major portion of the heat transfer between the hot process gas and the scrub solution takes place through the low pressure steam which is directly sparged or injected into the stripper. The direct injection of this steam provides the best type of heat transfer, since there is direct contact between the heating agent and the material being heated, within the stripper. Another advantage derives from the fact that prior reboiler coils for this service were generally made of stainless steel, which is a relatively expensive material. With the arrangement of the present invention, less expensive materials such as aluminum may be employed, particularly for the steam generation heat exchangers. Furthermore, the stainless steel reboiler unit in the stripper now becomes relatively small, since the major proportion of the heat transfer duty is accomplished by the direct injection of steam. In addition, the temperature of the steam employed in the reboiler unit is significantly lower than the process gas temperature, and thus the scrub solution film temperature is reduced.

The preliminary generation of steam by use of the hot process gas and subsequent usage of this steam to regenerate the scrub solution in the stripper may appear at first glance to be uneconomical as compared to direct heat exchange between the hot process gas and the scrub solution. Thus, this process sequence has been overlooked by the prior art. However, applicants have recognized that generation of low pressure steam provides good heat transfer rates, and further that adequate heat transfer and full regeneration may be accomplished in this situation by the action of directly injected steam. In this manner, the process of the present invention derives the advantages of corrosion reduction as discussed supra while still achieving the primary function of scrub solution regeneration.

It is an object of the present invention to provide an improved process for removal of weakly acidic gases from gas streams.

Another object is to minimize or eliminate corrosion in the regeneration of alkaline scrub solutions employed to remove weakly acidic gases from gas streams.

A further object is to effectively recover and utilize the heat which is available in hot process gases, prior to the scrubbing of such gases for removal of weakly acidic gas components.

An additional object is to achieve effective utilization at lower tempereature levels of heat which is available in process gas at high temperature levels.

Still another object is to reduce or avoid corrosion in the regeneration of alkaline scrub solutions, by regenerating fully through indirect employment of heat of high temperature level, whereby high film temperatures are avoided.

Still a further object is to utilize the heat available in hot process gas prior to scrubbing such gases with alkaline solutions for removal of weakly acidic components, by means of a process sequence in which this heat is more effectively applied to the regeneration of such alkaline solutions.

These and other objects and advantages of the present invention will become evident from the description which follows. Referring to the FIGURE, stream 1 is the hot, moisture-laden process gas stream such as synthesis gas which is to be treated in accordance with the process of the present invention. Stream 1 may be derived from partial oxidation or steam reforming of hydrocarbons. Alternatively, stream 1 may consist of a hydrogen-rich gas stream produced by the reaction known as the water gas shift, wherein the carbon monoxide in a synthesis gas is catalytically reacted with water vapor at elevated temperature to produce a hydrogen-rich gas stream. In any case, stream 1 is obtained at an elevated temperature, generally in the range of 350° F. to 500° F. Additionally, stream 1 is usually at an elevated pressure, between 350 p.s.i.g. to 450 p.s.i.g. It should be understood that stream 1 as shown in the figure is obtained at this elevated pressure, whereby the process is carried out in a preferred embodiment using hot potassium carbonate scrub solution at two pressure levels.

Stream 1 is first passed at elevated temperature and pressure into steam generation means 2, which may be a steam boiler or other suitable steam generation apparatus. Condensate water is passed via 3 into the coil 4 of boiler 2, and generated steam is removed via 5. The downstream pressure of generated steam 5 is controlled by valve 6, which regulates the pressure at which the steam is subsequently passed via 7 to utilization in the process, to a suitable level between about 20 p.s.i.g. to 50 p.s.i.g.

As a result of the cooling in unit 2, the process gas stream is removed via 8 at an intermediate lower temperature. Stream 8 will now usually contain liquid water condensate, since the cooling in unit 2 usually serves to remove heat of condensation as well as sensible heat from the gas stream. Generally speaking, stream 1 will usually be saturated with water vapor and thus the cooling in unit 2 will immediately produce this condensation. The process stream 8 now passes into unit 9, which is a steam generation apparatus having a function and mode of operation similar to unit 2 described supra. Further cooling of the process stream takes place in unit 9, while condensate water is passed into coil 10 of unit 9 via 11, and generated steam is removed via 12. The steam in line 12 is also passed to process usage, but differs from steam line 7 in that a lower pressure level is maintained in line 12. As will appear infra, the pressure of the steam in line 12 depends essentially on the operating pressure inside the process unit in which the steam is subsequently utilized, since the steam is directly injected from line 12 into this process usage. Thus, the steam pressure in line 12 will usually range between about 5 p.s.i.g. to 15 p.s.i.g., but in any case will be lower than the pressure in line 7. It should be understood that the steam in lines 7 and 12 is saturated in both cases, thus the steam temperature in line 7 will usually be in the range of 260° F. to 300° F., while the steam temperature in line 12 will be in the range of 225° F. to 250° F. It should be noted that steam generation may alternatively be accomplished by passing the process gas stream through the boiler coil or tubes, and feeding condensate water to the shell side of the unit.

The cooled process stream now leaves unit 9 via 13, usually at a temperature in the range of 240° F. to 280° F. Stream 13 now contains a large quantity of condensed liquid water, and hence passes first into unit 14, which is a conventional type of dephlegmator or entrainment separator. Condensed liquid water is removed from unit 14 via 15, while the process stream, now free of entrained water, leaves unit 14 via 16 and passes into gas scrubber 17. Scrubber 17 may be any type of known gas-liquid contact apparatus, and is preferably provided with packed section 18 to promote gas-liquid contact. Other apparatus means such as bubble-cap plates may be employed instead of or in addition to packed section 18.

Inside unit 17, the process gas stream 16 is scrubbed by alkaline scrub solution admitted via 19. Stream 19 is preferably an aqueous solution of potassium carbonate-bicarbonate, although other well-known aqueous scrub solutions such as sodium carbonate, monoethanolamine, or other alkanol amine may be employed for this purpose. As a result of the scrubbing action packed section 18, the weakly acidic gas component in stream 16 is absorbed into the liquid solution. The purified gas stream, now either low in or essentially freed of acidic gas component, is removed from unit 17 via 20 and passed to further processing. A cooler or entrainment separator, not shown, may be provided in line 20 to separate entrained or vaporized scrub solution from the process stream as a liquid side-stream which is subsequently recycled to unit 17.

The resulting scrub solution laden with acidic gas component is removed from unit 17 via 21, and is now at a pressure of about 350 p.s.i.g. to 450 p.s.i.g. and a temperature in the range of about 240° F. to 280° F. Stream 21 is now regenerated, preferably at a lower pressure, by a process sequence involving heating wherein the previously generated streams 7 and 12 of process steam are employed to furnish the required heat. Stream 21 thus passes first through expansion valve 22, and is then injected via 23 at a pressure in the range of 2 p.s.i.g. to 10 p.s.i.g. into regeneration vessel 24. Unit 24 is a stripper or other type of apparatus for the removal of contained gas from a liquid. When stream 23 is passed into unit 24, a gas mixture consisting of a portion of the contained acidic gas together with steam is immediately evolved due to the reduced pressure. This gas mixture thus immediately passes upward, and may contain entrained scrub solution. Consequently, a packed section 25 or other de-entrainment means is preferably provided above the entry point of stream 23, so as to prevent any entrained scrub solution from passing overhead. The final overhead gas stream, consisting of a mixture of steam and acidic gas component derived from the scrub solution during regeneration, is now removed via 26 and is preferably cooled in a separator-cooler 27. The final acidic gas is now removed via 28, and may be discarded or passed to other utilization. The condensed liquid water is recovered via 29, and may be either discarded via 30 or recycled to the process via 31 in a manner to be described infra.

Returning now to scrub solution stream 23, the unvaporized liquid portion of this stream now passes downwards through the packed section 32 of unit 24, countercurrent to a rising mixed vapor stream consisting of steam and acidic gas component. The liquid stream may be heated somewhat by this contact, but the primary function of section 32 is to regenerate the liquid stream at the reduced pressure by liberating the absorbed acidic gas into the rising mixed vapor stream. Other gas-liquid contact means such as bubble cap plates may be employed instead of or in addition to unit 32. The rising mixed vapor stream joins the initially vaporized portion of stream 23 above section 32, and the combined gas stream leaves via 26 as described supra.

The downflowing liquid solution now collects in the bottom of unit 24 as pool 33. The final regeneration of the liquid solution 33 is accomplished by heating, by means of reboiler coils 34 which receive steam from line 7. The resulting condensed steam is removed from coil 34 via 35, and may be recycled to liquid condensate feed stream 3. The major portion of the solution regeneration in unit 24 is accomplished by direct contact between downflowing solution and rising steam in section 32. Only a minor portion of the rising steam is derived from heating due to reboiler coils 34. Most of this steam is obtained by direct injection or sparging of steam from line 12, which is admitted directly into unit 24 below packed section 32.

The fully regenerated scrub solution now leaves unit 24 via 36. Solution 36 will usually be of a solution strength which is somewhat higher than optimum, due to concentration during regeneration. Consequently, liquid condensate water stream 31 may be combined with stream 36 in some cases, in order to dilute the solution strength and produce combined stream 37 of proper solution concentration. The regenerated scrub solution 37 may be cooled if necessary in cooler 38, passed via 39 to pump 40 and repressurized to the required pressure in the range of 350 p.s.i.g. to 450 p.s.i.g. for further gas scrubbing. The solution now leaves pump 40 via 19 and is recycled as described supra. It should be noted that water balance considerations are important in this process. Thus, if the proportion of regeneration heat which is indirectly added to the scrub solution through coil 34 is relatively small, no net concentration of the solution will take place during regeneration and subsequent dilution of stream 36 by stream 31 may not be required.

It will be appreciated that a large amount of steam is present in the overhead mixed vapor stream which is removed via 26 from unit 24. This steam content is primarily derived from the large quantity of steam which is directly injected into unit 24 via 12. Consequently, a portion or all of the liquid water stream 30 which is condensed and removed from stream 26 in unit 27, will usually be recycled to the process via 11. This recycle portion of stream 30 must usually be purified by ion exchange or chemical purification methods in order to remove traces of potassium carbonate which may be present. Otherwise a buildup of such potassium carbonate will take place in the boiler water section of unit 9, since a concentration effect will take place due to evaporation and removal of steam via 12.

Various alternatives may be practiced within the scope of the present invention. Thus, the arrangement of reboiler steam coils 34 within unit 24 provides what is known as a kettle-type reboiler. Other reboiler configurations may be adopted under suitable circumstances. Principal among these is the thermosyphon type of reboiler, which is an apparatus unit which is provided external to the main process unit 24. The process fluid such as alkaline scrub solution is thus removed from the main body of liquid 33, externally reheated and reboiled in a tube bundle by steam external to the unit, and then recycled to the unit 24 above the point of original solution withdrawal. The thermosyphon type of external reboiler is somewhat more expensive than submerged kettle-type reboiler coils inside the process vessel or other external types of reboilers, however, this type of process unit permits closer process control, and the buildup of localized concentration cells with attendant overheating and corrosion is avoided.

As mentioned supra, in numerous instances sodium or other alkali carbonates besides potassium carbonate may be employed as alkaline scrub solutions. Additionally, it is well known in the art that alkaline scrub solutions containing monoethanolamine or other alkanol amines are also employed as alkaline scrub solutions to remove weakly acidic gas components. When these alternative scrub solutions are employed, the concept of scrubbing at elevated pressure and regenerating at a reduced pressure level may not be employed. Consequently, in numerous instances gas streams are scrubbed with these alternative scrub solutions at low pressure, and these solutions are regenerated at the same pressure level by heating to a higher temperature. In such instances, apparatus such as pressure reducing valve 22 and pump 40 and their functions may possibly be omitted from the process, but in any case their process significance becomes minor. However, it should be understood that the process of the present invention is also applicable in such circumstances.

Numerous other process modifications besides those mentioned supra are well known in the art, and are readily applicable in conjunction with the process of the present invention. Thus for example, steam injected via 12 into unit 24 may be admitted into the unit at a plurality of points, either alternatively or simultaneously. Steam line 12 may thus be sparged directly into pool 33, at the level of or below coil 34. Steam line 12 or a portion thereof may be injected directly into the lower section of packing 32. These and other process modifications and alternatives will readily occur to those skilled in the art.

An example of industrial application of the process of the present invention will now be discussed.

*Example*

A hot process gas derived from partial oxidation of a liquid hydrocarbon followed by a water quench was designated for processing in accordance with the system of the present invention. The gas stream was obtained at 366° F. and 355 p.s.i.g., and contained a large proportion of carbon dioxide together with about 3% hydrogen sulfide. In addition, the gas stream was saturated with water vapor. Total gas stream feed was 2400 mols per hour, containing 1070 mols per hour of water vapor.

This gas stream was cooled to 364° F. in a first steam boiler, with steam being generated at 27 p.s.i.g. and 270° F. at the rate of 690 pounds per hour. This process steam was employed in a thermosyphon reboiler to regenerate the scrub solution laden with the aforementioned carbon dioxide and hydrogen sulfide. Total heat transfer was 660,000 B.t.u./hour.

The gas stream was further cooled to 260° F. in a second steam boiler, which served to generate 17,200 pounds per hour of steam at 240° F. and 10 p.s.i.g. This steam was directly sparged into the scrub solution during regeneration. Total heat transfer by this means was 16,900,000 B.t.u./hour.

The process gas stream, now at 260° F. and laden with liquid water condensate, was passed through an entrainment separator and then scrubbed with hot potassium carbonate solution at 350 p.s.i.g. for removal of carbon dioxide and hydrogen sulfide. The hot potassium carbonate solution was subsequently flashed down to 5 p.s.i.g. and regenerated in a stripper which employed the aforementioned streams of process steam for regenerative heating.

The temperature of the film of scrub solution immediately adjacent the tube wall in the thermosyphon reboiler was calculated to be a uniform 262° F. Under comparable total heat duty, it was calculated that passing the hot process gas stream through a conventional reboiler for scrub solution regeneration would result in a dynamic solution film temperature profile between a maximum of 306° F. at the hot gas inlet and a minimum of 245° F. at the gas outlet. It should be evident that the process of the present invention achieves a significant reduction in scrub solution film temperatures during regeneration, and thus results in an important reduction in the corrosion of process equipment.

We claim:

1. In a process for removing a weakly acidic gas component from a hot gas stream which comprises scrubbing said gas stream with a liquid alkaline absorbent for acidic gas component selected from the group consisting of aqueous solutions of alkanol amines and alkali carbonates, heating and steam stripping the resulting laden absorbent solution to separate dissolved acidic gas component as volatilized off-gas and thereby regenerate said absorbent solution, and recycling said regenerated absorbent solution to said gas scrubbing, the improvement which comprises partially cooling said hot gas stream prior to said scrubbing step by heat exchange with liquid water in a first steam generation means, whereby a first stream of process steam is generated, further cooling said hot gas stream prior to said scrubbing step by heat exchange with liquid water in a second steam generation means, whereby a second stream of process steam is generated, condensing said first stream of process steam by indirect heat exchange with said absorbent solution in said heating and stripping step, and injecting said second stream of process steam into said absorbent solution in said heating and stripping step.

2. Process of claim 1, in which the acidic gas component is carbon dioxide.

3. Process of claim 1, in which the acidic gas component is hydrogen sulfide.

4. In a process for removing a weakly acidic gas component selected from the group consisting of carbon dioxide and hydrogen sulfide from a hot moisture-laden synthesis gas stream at elevated pressure which comprises scrubbing said gas stream with a liquid alkaline absorbent for acidic gas comprising aqueous potassium carbonate solution, reducing the pressure of the resulting absorbent solution containing dissolved acidic gas, heating and steam stripping said solution to separate dissolved acidic gas as volatilized off-gas and thereby regenerate said absorbent solution, repressurizing said regenerated absorbent solution, and recycling said regenerated absorbent solution to said hot gas scrubbing, the improvement which comprises partially cooling said hot moisture-laden synthesis gas stream prior to said scrubbing step by heat exchange with liquid water in a first steam generation means, whereby a first stream of process steam is generated and a portion of said moisture is condensed from said gas stream, further cooling said hot gas stream prior to said scrubbing step by heat exchange with liquid water in a second steam generation means, whereby a second stream of process steam is generated and a further portion of said moisture is condensed from said gas stream, condensing said first stream of process steam by indirect heat exchange with said absorbent solution in said heating and stripping step, injecting said second stream of process steam into said absorbent solution in said heating and stripping step, and separating said condensed moisture as liquid water from said synthesis gas stream.

5. In a process for removing a weakly acidic gas component selected from the group consisting of carbon dioxide and hydrogen sulfide from a moisture-laden synthesis gas stream produced at 350° F. to 500° F. and 350 p.s.i.g. to 450 p.s.i.g. by hydrocarbon conversion which comprises scrubbing said gas stream with a liquid alkaline absorbent for acidic gas comprising aqueous potassium carbonate solution, reducing the pressure of the resulting absorbent solution containing dissolved acidic gas to the range of 2 p.s.i.g. to 10 p.s.i.g., heating and steam stripping said solution to separate dissolved acidic gas as volatilized off-gas and thereby regenerate said absorbent solution, repressurizing said regenerated absorbent solution to the range of 350 p.s.i.g. to 450 p.s.i.g., and recycling said regenerated absorbent solution to said hot gas scrubbing, the improvement which comprises partially cooling said synthesis gas stream prior to said scrubbing step by heat exchange with liquid water in a first steam generation means, whereby a first stream of process steam is generated at a temperature in the range of 260° F. to 300° F., further cooling said synthesis gas stream to a temperature between 240° F. and 280° F. prior to said scrubbing step by heat exchange with liquid water in a second steam generation means, whereby a second stream of process steam is generated at a temperature in the range of 225° F. to 250° F., condensing said first stream of process steam by indirect heat exchange with said absorbent solution in said heating and stripping step, whereby said absorbent solution is regenerated at a temperature between 230° F. to 250° F., and injecting said second stream of process steam into said absorbent solution in said heating and stripping step.

6. Process of claim 5, in which said volatilized off-gas stream is cooled whereby water vapor in said off-gas stream is condensed to liquid water, said liquid water is freed of traces of dissolved potassium carbonate by purification means, and the resulting purified liquid water is passed to at least one of said stages of steam generation.

References Cited in the file of this patent
UNITED STATES PATENTS

| 2,886,405 | Benson et al. | May 12, 1959 |

FOREIGN PATENTS

| 597,598 | Great Britain | Jan. 29, 1948 |
| 786,669 | Great Britain | Nov. 20, 1957 |